US006575517B2

(12) United States Patent
Yamagishi et al.

(10) Patent No.: US 6,575,517 B2
(45) Date of Patent: Jun. 10, 2003

(54) CLOSURE APPARATUS AND METHOD FOR LID OF COMPARTMENT APPLICABLE TO VEHICULAR TRUNK LID

(75) Inventors: Jun Yamagishi, Yokohama (JP); Katsumi Nakagome, Yokohama (JP)

(73) Assignee: Ohi Seisakusho Co., Ltd., Kanagawa (JP)

( * ) Notice: Subject to any disclaimer, the term of this patent is extended or adjusted under 35 U.S.C. 154(b) by 0 days.

(21) Appl. No.: 10/023,794

(22) Filed: Dec. 21, 2001

(65) Prior Publication Data

US 2002/0084668 A1 Jul. 4, 2002

(30) Foreign Application Priority Data

Dec. 28, 2000 (JP) ....................................... 2000-399960
Dec. 28, 2000 (JP) ....................................... 2000-399961

(51) Int. Cl.[7] .......................... B62D 25/10; B62D 33/04

(52) U.S. Cl. ..................... 296/76; 49/280; 292/DIG. 43

(58) Field of Search ............................ 296/76; 220/211; 49/26, 27, 28, 279, 280, 281, 293; 292/201, 341.16, DIG. 43

(56) References Cited

U.S. PATENT DOCUMENTS 3,662,491 A * 5/1972 Boyriven ........................ 49/28
3,678,622 A * 7/1972 Miller ........................... 49/28
4,851,742 A * 7/1989 Chapman .................... 318/286
4,881,018 A 11/1989 Kato et al. ...................... 318/9
5,616,997 A * 4/1997 Jackson et al. ............. 318/467
6,112,583 A * 9/2000 Yamamura ................... 73/116
6,409,233 B1 * 6/2002 Hanaki ....................... 292/144
2002/0070579 A1 * 6/2002 Nakagome .................. 296/76

* cited by examiner

*Primary Examiner*—D. Glenn Dayoan
*Assistant Examiner*—Paul Chenevert
(74) *Attorney, Agent, or Firm*—Sughrue Mion, PLLC

(57) ABSTRACT

In closure apparatus and method for an elongated lid of a compartment, the lid being pivotally supported on a wall defining the compartment via a pair of mutually spaced apart hinge arms, a control device controls each of a first driving device and an electromagnetic clutch to make a deformation of the lid to the compartment return to its original form in response to an output of the locked state detection signal from the detecting section. In the first embodiment, a rotation direction of a reversible motor is changed to a reverse direction which corresponds to an open direction of the lid to drive the lid toward the open direction in response to the output of the locked state detection signal.

10 Claims, 7 Drawing Sheets

LOCKED STATE DETECTION SW (19)
ON
OFF

FULL CLOSURE DETECTION SW (21)
ON
OFF

MOTOR (12a)
ROTATION
STOP
CLOSURE OPERATION
T sec

CLUTCH VOLTAGE
DRIVE VOLTAGE
WITHIN T sec
OV

CLOSURE APPARATUS AND METHOD FOR LID OF COMPARTMENT APPLICABLE TO VEHICULAR TRUNK LID

BACKGROUND OF THE INVENTION

1. Field of the Invention

The present invention relates to closure apparatus and method for a lid of a compartment such as a trunk lid of a compartment such as a trunk lid of a luggage compartment, a tail gate (or back door), and a hood of an automotive vehicle by driving the lid in a closure direction by means of a driving device such as a reversible motor.

2. Description of the Related Art

A U.S. Pat. No. 4,881,018 issued on Nov. 14, 1989 (which is equivalent to a Japanese Patent Application First Publication No, Heisei 1-163386 published on Jun. 27, 1989) exemplifies a previously proposed vehicular trunk lid closure apparatus.

The above-described previously proposed vehicular trunk lid closure apparatus includes: first driving device which drives the trunk lid which is pivotally supported on a vehicle body (wall of a luggage compartment) in at least a closure direction; an electromagnetic clutch which disconnectably connects an operation force transmission path between the trunk lid and the first driving device; a lock device which restricts the trunk lid into the closure state; and a second driving device which drives the trunk lid from an immediate complete closure prior position to a complete (full) closure position.

SUMMARY OF THE INVENTION

However, since, in the previously proposed vehicular trunk lid closure apparatus, the first driving device is linked only to one side of the trunk lid (so-called, one-side drive) with such problems as a cost it takes and an attachment space taken into consideration, the trunk lid is deformed due to a positional deviation of the trunk lid, viz., leftward and rightward sides of the trunk lid with respect to a vertical direction of the vehicle body occurs at the immediate complete closure prior position upon which a reaction force of a seal member extended on an opening of the luggage compartment (so called, seal reaction force) is acted.

In details, when the trunk lid is driven in the closure direction by means of the first driving device to be reached to the immediate complete closure prior position and is engaged with a striker of the lock device disposed on the vehicle body, the leftward side of the trunk lid to which the first driving device is linked is strongly pressed against the seal member by the first driving device. However, the rightward side of the trunk lid to which the first driving device is linked is deformed in a crimped manner on the opening due to a biasing force developed from the seal member and/or gas stay. In the above-described state, the drive of the trunk lid is switched from the first driving device to the second driving device so that the trunk lid is driven in the complete closure position. It is necessary to stop the operation of the first driving device, with the electromagnetic clutch disconnected, before the operation of the second driving device. At this time, when the electromagnetic clutch is disconnected with the trunk lid deformed, an eternal force of the first driving device acted upon the leftward side of the trunk lid is eliminated. Hence, a distortion energy stored in the trunk lid together with the seal reaction force and the biasing force of the gas stay causes the leftward side of the trunk lid to forcibly be lifted in an upward direction so that a strange or unpleasant sound is developed to deteriorate a good quality feeling With the above-described problems in mind, it is an object of the present invention to provide a closure apparatus and method for a lid of a compartment such as a trunk lid of a luggage compartment of an automotive vehicle which can prevent the unpleasant sound for the lid closed by the driving device from being developed and can improve the good quality feeling.

According to one aspect of the present invention, there is provided a closure apparatus for an elongated lid of a compartment, the lid being pivotally supported on a wall defining the compartment via a pair of mutually spaced apart hinge arms, comprising: a driving device that drives the lid to be pivoted in at least a closure direction via one of the pair of mutually spaced apart hinge arms; an electromagnetic clutch that disconnectably connects an operation force transmission path between the driving device and the lid; a look device that is enabled to be engaged with the lid at a first closure position of the lid to the compartment and to restrict the lid into a locked state; a detecting section that detects an engagement state of the lock state of the lock device with the lid and outputs a locked state detection signal indicating the engagement state thereof with the lid; and a control device that controls each of the driving device and the electromagnetic clutch to make a deformation of the lid to the compartment return to its original form in response to an output of the locked state detection signal from the detecting section.

According to another aspect of the present invention, there is provided a closure method for an elongated lid of a compartment, the lid being pivotally supported on a wall defining the compartment via a pair of mutually spaced apart hinge arms, comprising: driving the lid to be pivoted in at least a closure direction via one of the pair of mutually spaced apart hinge arms; providing an electromagnetic clutch disconnectably connecting an operation force transmission path between the driving device and the lid; providing a lock device that is engaged with the lid at a first closure position of the lid to the compartment and restricts the lid into a locked state; detecting an engagement state of the lock state of the lock device with the lid; outputting a looked state detection signal indicating the engagement state thereof with the lid: and controlling each of the driving device and the electromagnetic clutch to make a deformation of the lid to the compartment when the lid is engaged with the lock device return to its original form in response to an output of the locked state detection signal.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
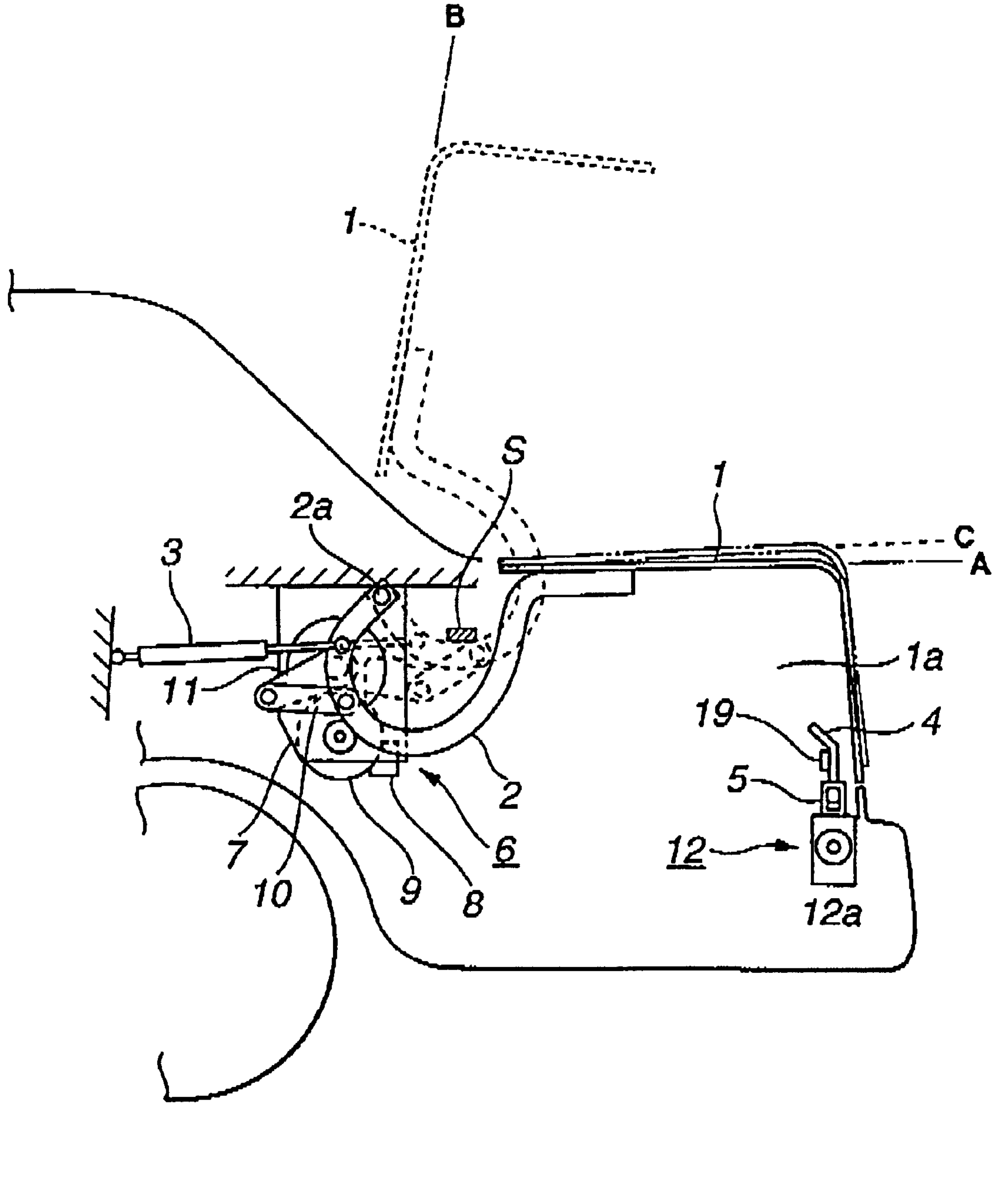
FIG. 1 is a schematic side view of a rear portion of an automotive vehicle to which a closure apparatus in a first preferred embodiment according to the present invention is applicable.
Figure 2:
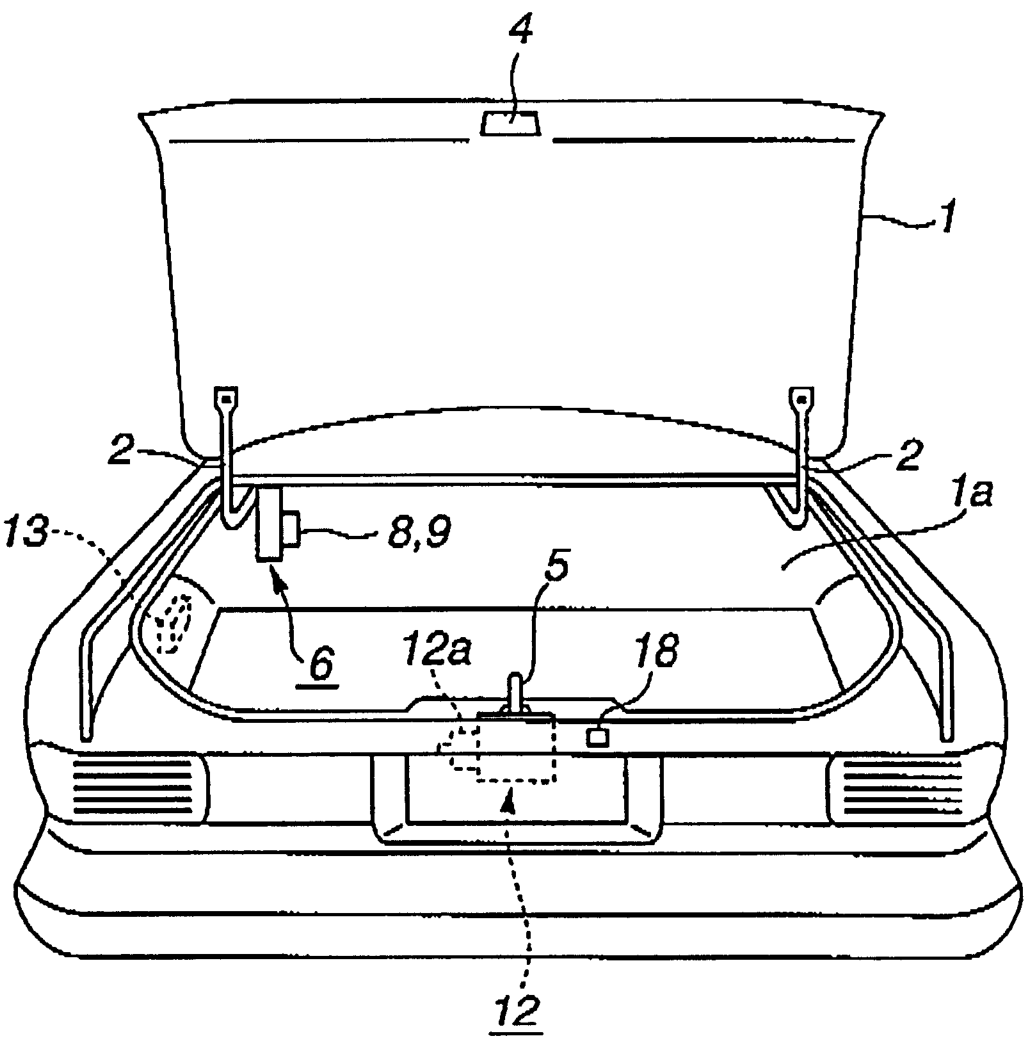
FIG. 2 is a schematic view of the lid as viewed from a rearward direction of the vehicle shown in FIG. 1.

FIG. 1 shows a rough configuration of a rear portion of an automotive vehicle to which a closure apparatus in a first preferred embodiment according to the present invention is applicable. FIG. 2 shows an outer appearance of a trunk lid as viewed from a rearward direction of the vehicle shown in FIG. 1.

Trunk lid 1 serves to close or open a luggage compartment 1*a* of an automotive vehicle. Trunk lid 1 is pivotally supported on a rear portion (wall of the luggage compartment) of a vehicle body via a pair of left and right hinge arms 2 having left and right hinge axles 2*a* to enable open and closure of the luggage compartment 1*a*. Trunk lid 1 can be pivoted between a complete closure position A denoted by a solid line in FIG. 1 and a full open position B denoted by a dash line in FIG. 1. A pair of left and right gas stays 3 are interposed between a corresponding one of the pair of left and right hinge arms 2 and the vehicle body to provide a biasing force to pivot trunk lid 1 toward the open direction. It is noted that a more open directional pivotal movement of trunk lid 1 is limited by a contact of each hinge arm 2 on a stopper S installed on the vehicle body.

A lock device 4 is attached onto an approximately center of a rear end portion (wall) of the trunk lid 1. Lock device 4 is engaged with a striker 5 supported on the vehicle body at an immediate complete closure prior position C denoted by a dot-dot-and-dash line (phantom line) in FIG. 1 so that trunk lid 1 is restricted into the closure state.

An open/closure device 6 constituting a first driving device drives trunk lid 1 from the full open position B to the immediate complete closure prior position C and vice versa. Open/closure device 6 includes: a base plate 7 fixed onto a panel located at a left-and-front position of the luggage compartment 1*a*; a reversible electric motor 8; an electromagnetic clutch 9 disposed within a speed-reduction device (not shown) to reduce the speed of a rotating torque of motor 8; and an output arm 11 having a free end portion linked to left one of the pair of hinge arms 2 via link 10 and which is pivotable via the speed-reduction device and the electromagnetic clutch 9 by means of motor 8. Open/closure device 6 drives, through the above-described one-side drive, trunk lid 1 in the open direction and closure direction.

Electromagnetic clutch 9 intervened in an operation force transmission path between motor 8 and output arm 11. Electromagnetic clutch 9 is ordinarily disconnected (i.e., this clutch disconnects the transmission path) so that a manual open or closure operation of trunk lid 1 is enabled. Transmission path is connected by electromagnetic clutch 9 receiving a power supply from a power supply circuit so that the torque of motor 8 is enabled to be transmitted to the output arm 11, viz., trunk lid 1.

A closure device 12 constituting a second driving device drives striker 5 in a further closure (lower direction) by means of a torque of another motor 12*a* and drives trunk lid 1 from the immediate complete closure prior position C to complete closure position A via striker 5 by engaging lock device 4 to striker 5. A driving force to drive trunk lid 1 in the closure direction is switched from open/closure device 6 to closure device 12 at a time point at which lock device 4 is engaged with striker 5. Motor 8, electromagnetic clutch 9, and motor 12*a* of closure device 12 are controlled by means of a control device 13 mounted in the vehicle body.

Figure 3:
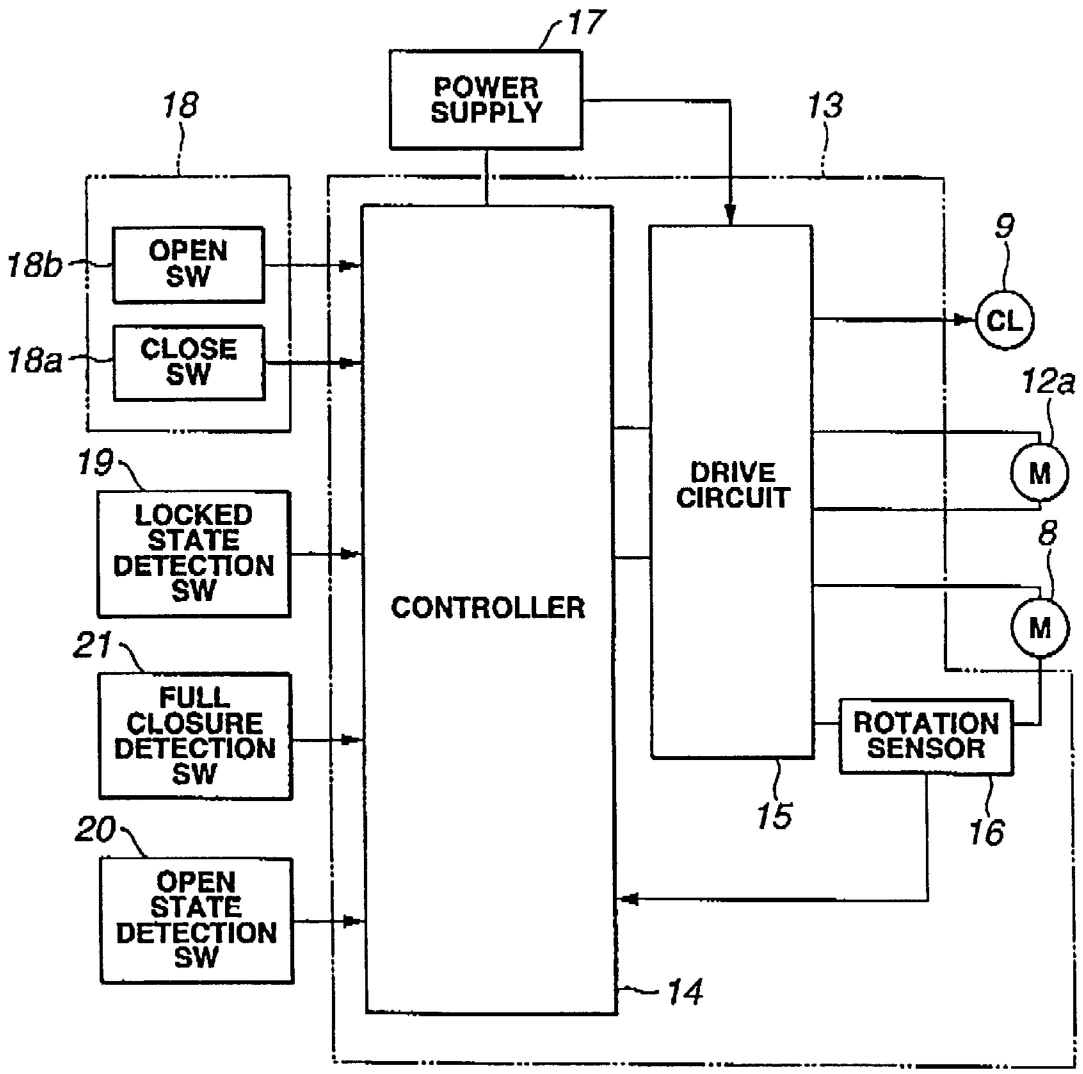
FIG. 3 is a schematic block diagram of a control device of the closure apparatus in the first preferred embodiment shown in FIGS. 1 and 2.

FIG. 3 shows a peripheral circuit of control device 13. Control device 13 includes a controller 14, drive circuit portion 15, and a rotation sensor 16. Controller 14 outputs signals to motors 8 and 12*a* and electromagnetic clutch 9 in response to signals from respective switches.

Drive circuit portion 15 supplies their drive power supply 17 to motor 8 and motor 12*a* of closure device 12 in response to each signal of controller 14. Rotation sensor 16 is serially connected between motor 8 and drive circuit portion 15 to detect a ripple current developed at the time of drive of motor a and inputs a pulse waveform corresponding to the ripple current to controller 14.

Controller 14 counts a number of pulses outputted from rotation sensor 16 and recognizes a rotation speed of motor 8, viz., a displacement of trunk lid 1 through the detection of the number of pulses outputted from rotation sensor 16. An operation switch 18 is disposed in a vicinity to luggage compartment 1*a* to operate open/closure device 6. Controller 14 renders electromagnetic clutch 9 in the connection state In response to each operation signal of either closure switch 18*a* or open switch 18*b* and outputs signals to control the rotational direction of motor 8 in a normal or reverse direction to drive circuit portion 15. Thus, trunk lid 1 is driven in the closure direction or open direction according to the operation of open/closure device 6. A lock state detection switch 19 is disposed on lock device 4 to detect an engagement state of lock device 4 to striker 5 and to output a locked state detection signal to controller 14. An open detection switch 20 is disposed on base plate 7 of open/closure device 6 to detect a position immediately before complete open position B of trunk lid 1 via output arm 11 and to output an open stop signal to controller 14. A closure detection switch 21 is disposed on base plate 7, detect immediate complete closure prior position C of trunk lid 1 via output arm 11 and to output a closure stop signal to controller 14.

Controller 14 resets the number of pulses to "0" at a time point at which lock detection switch 19 and closure detection switch 21 output the respective detection signals, maintains the power supply to electromagnetic clutch 9, controls the rotation of motor 8 to change the direction from the normal direction to the reverse direction, counts the number of pulses during the reverse rotation of motor 8 by a predetermined number of pulses, and, thereafter, inputs signals to stop the power supply to motor 8 and electromagnetic clutch 9 to drive circuit portion 15. Motor 12*a* starts its drive at a time point at which the number of pulses are reset to "0".

It is noted that trunk lid 1 is returned to the open direction from the immediate complete closure prior position to the open position by a predetermined quantity by the rotation control of controller 14 from the normal direction to the reverse direction of motor 8. A return quantity of trunk lid 1 is set with the left and right deformation quantities of trunk lid 1 taken into consideration.

Next, with reference to the flowchart shown in FIG. 4, the closure operation of the closure apparatus in the first embodiment will be described below.

It is noted that controller 14 includes a microcomputer having a CPU (Central Processing Unit), RAM (Random Access Memory), ROM (Read Only Memory), an Input/Output Interface, a data bus, a control bus, and so forth.

That is to say, at a step S1, in response to the complete open position B of trunk lid 1 and the operation of closure switch 18*a* in operation switch 18, controller 14 outputs signals to control motor B and electromagnetic clutch 9 of open/closure device 6 to drive circuit portion At steps S2 and S3, controller 14 commands the power supply to motor 8 and electromagnetic clutch 9 to power supply 17 so that electromagnetic clutch 9 is in the connection state and motor 8 is in the normal rotation state. Thus, trunk lid 1 is driven in the closure direction by means of open/closure device 6.

When trunk lid 1 reaches to immediate complete closure prior position C and lock device 4 engages with striker 5, at a step S4, controller 14 detects the engagement state of looked state detection switch 19 of lock device 4. At step S4, controller 14 detects the position of output arm 11 from closure detection switch 21. It is noted that, at this immediate complete closure prior position C, trunk lid 1 is deformed in the same way as described in the previously proposed vehicular trunk lid closure apparatus.

If both of locked state detection switch 19 and closure detection switch 21 develop respective detection signals, at a step S5, controller 14 once stops the power supply to motor 8. At a step S6, controller 14 resets the number of pulses developed from rotation sensor 16 to "0". Next, at a step S7, controller 14 controls the rotation of motor 8 in the reverse direction and counts the number of pulses developed from rotation sensor 16 when motor 8 is rotated in the reverse direction.

At a step S8, controller 14 counts the number of pulses by a predetermined number. Then, at steps S9 and S10, controller 14 stops motor 8 and disconnects electromagnetic clutch 9. Therefore, the leftward side of trunk lid 1 to which open/closure device 6 is linked is returned toward the open direction by the predetermined quantity corresponding to the deformation quantity of trunk lid 1 at the immediate complete closure prior position C. Hence, the leftward side of trunk lid 1 does not develop the unpleasant sound due to the forcible lift by means of the seal reaction force and the biasing force of gas stays 3 and energy stored in trunk lid 1 in the deformed state as described in the previously proposed vehicular trunk lid closure apparatus.

In parallel to the flow of steps S5 through S10, closure device 12 drives trunk lid 1 from immediate complete closure prior position C to complete closure position A by means of other motor 12*a* which is rotated in the normal direction. At a step S12, when trunk lid 1 is in the complete closure state, motor 12*a* stops so that operation of closure device 12 is stopped.

The present Invention is not limited to the first preferred embodiment described above. The present invention is applicable to a case where driving force of open/closure device 6 is enlarged and open/closure device 6 directly closes trunk lid 1 from full (complete) open position B to full (complete) closure position A. In this alternative case, closure device 12 may not be necessary and lock device 4 may be engaged with striker 5 at complete closure position A.

Next, a second preferred embodiment of the closure apparatus according to the present invention will be described below.

The second preferred embodiment is different from the first preferred embodiment in that an applied voltage to electromagnetic clutch 9 is gradually reduced for electromagnetic clutch 9 to be in a semi-clutched state (intermediate state between the clutched state and the released state) for a predetermined period of time from a time point at which locked state detection switch 19 outputs the locked state detection signal to controller 14 and, upon the elapse of the predetermined period of time, the applied voltage to electromagnetic clutch 9 is zeroed so as to be in the disconnection state. It is noted that motor 8 is stopped at the time point at which the locked state of lock device 4 is detected.

Figure 5:
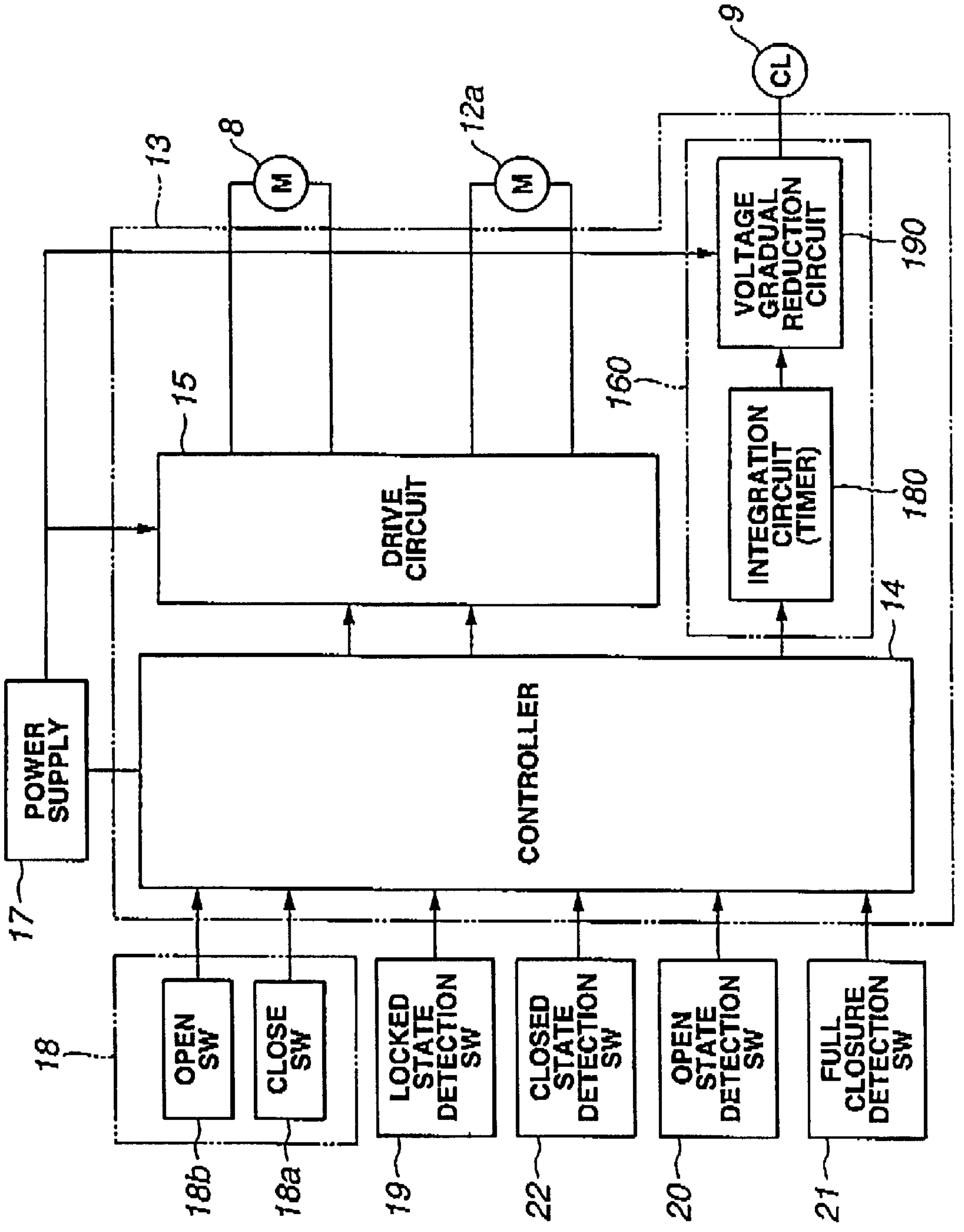
FIG. 5 is a schematic block diagram of a control device of the closure apparatus in a second preferred embodiment according to the present invention.

FIG. 5 shows a schematic block diagram of the control device including controller 14 in the closure apparatus in the second preferred embodiment. As shown in FIG. 5, electromagnetic clutch 9 is connected to power supply 17 via an electromagnetic clutch drive circuit 160. Electromagnetic drive circuit 160 includes: an integration circuit 180 (with a timer) having an operational amplifier, a resistor, and a capacitor; and a voltage gradual reduction circuit 190 whose output voltage is gradually reduced toward zero in an inverse proportion to the output voltage of the integration circuit 180 which is gradually increased along with an elapse of time.

When a drive signal is outputted from controller 14, a drive voltage from drive circuit 160 is continued to be applied to electromagnetic clutch 9 so that electromagnetic clutch 9 is in the connection state. When a voltage gradual reduction signal is outputted from controller 14, a switching element in the integration circuit 180 is switched so that the clutched applied voltage is gradually reduced from the normal drive voltage and is reduced to zero volt upon the elapse of the predetermined time by the activation of the timer. The other structures of each component of the closure apparatus in the second embodiment shown in FIG. 5 are the same as those shown in FIGS. 1, 2, and 3.

Figure 7:
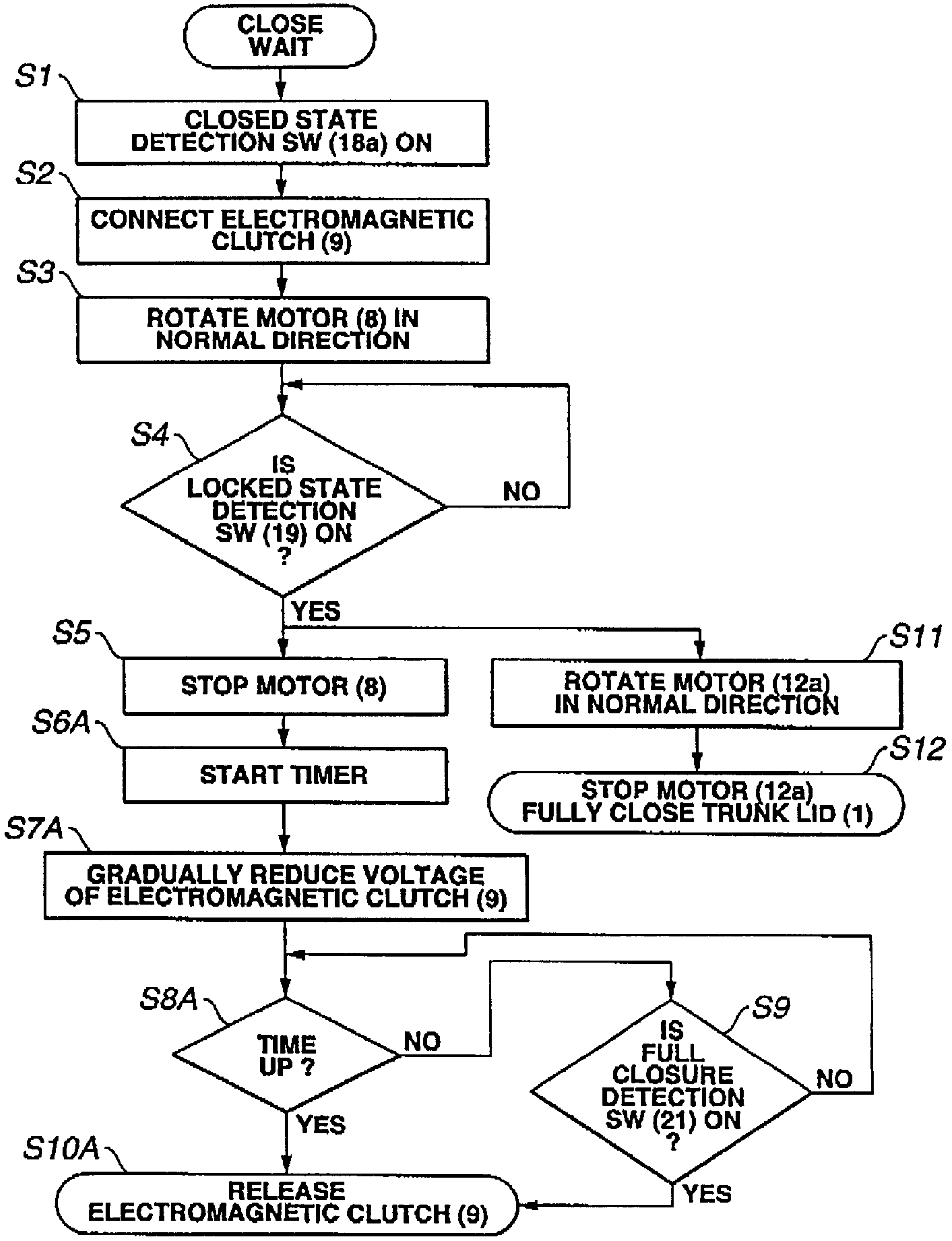
FIG. 7 is an operational flowchart representing a flow of the closure operation in the case of the second preferred embodiment of the closure apparatus shown in FIG. 5.

FIG. 7 shows an operational flowchart for explaining an operation of the second embodiment shown in FIG. 5.

Figure 4:
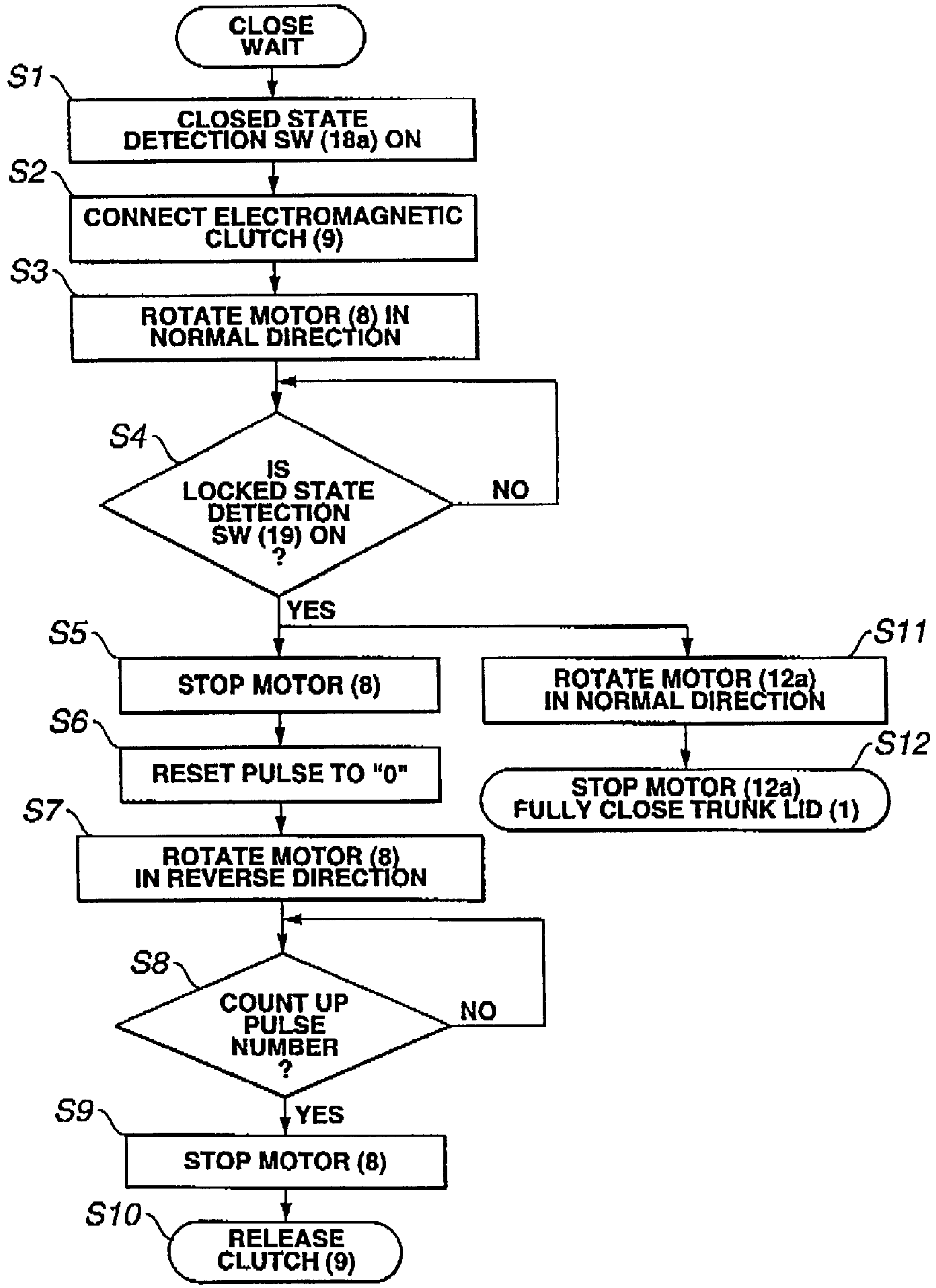
FIG. 4 is an operational flowchart representing a flow of a closure operation of the lid in the case of the first preferred embodiment shown in FIGS. 1 through 3.

It is noted that the same step numbers shown in FIG. 7 as those shown in FIG. 4 execute the like processes and the detailed description will herein be omitted.

That is to say, if the locked state detection switch 19 outputs the locked state detection signal at step S4, motor 8 is stopped at step S5 by turning off the power supply 17 to motor 8 and switches the switching element of integration circuit and starts the timer of integration circuit 180 at a step S6A. It is noted that, at a step S7A, the timer in integration circuit 180 is activated to measure a time duration. Hence, the leftward side of trunk lid 1 to which open/closure device 6 is linked gradually reduces its form to its original form against a friction force of electromagnetic clutch 9 which is in the semi-clutched state.

Figures 6A, 6B, 6C, 6D:
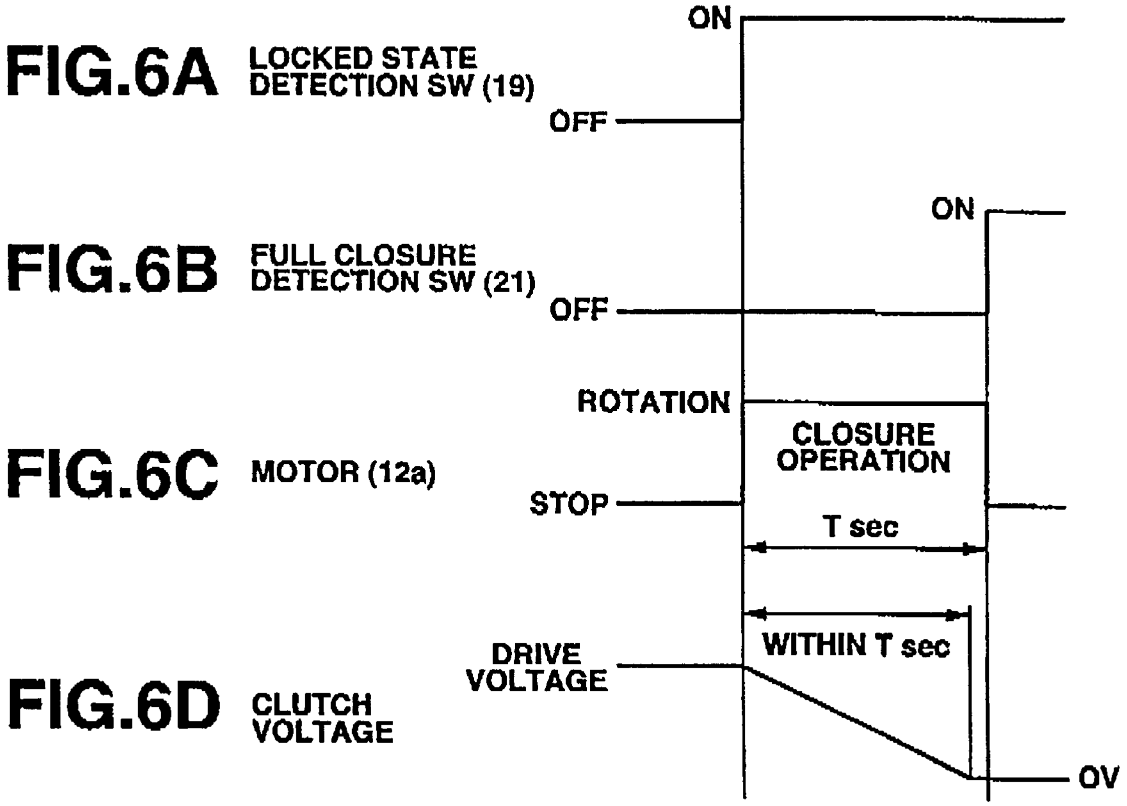
FIGS. 6A, 6B, 6C, and 6D are timing charts for explaining an operation of the second preferred embodiment of the closure apparatus shown in FIG. 5.

Hence, the same advantage as described in the first embodiment can be achieved in the second embodiment. At a step S8A, if predetermined period of time T (second) has passed from the time at which the timer is started, the time up (Yes) is resulted or if, at step S9, complete closure switch (fully closed state switch) 21 is turned to ON before the timer is up (the timer measures the elapse of the predetermined period of time, the applied voltage of electromagnetic clutch 9 is zeroed as shown in FIG. 6A. At a step S10A, electromagnetic clutch 9 is released (in the disconnection state). The series of operation in the second embodiment will be appreciated from FIGS. 6A through 6D. The present invention is not limited to the second preferred embodiment described above, the modification and variation in the case of the first embodiment are applicable to those in the second embodiment.

It is noted that, in the first embodiment, the number of pulses (the predetermined quantity) developed from rotation sensor 16 when motor 8 is rotated in the reverse direction (the reverse direction corresponds to the open direction of trunk lid 1) in response to the locked state detection signal and, for example, 60 pulses and, in the second embodiment, the predetermined period of time by which the timer is counted is, for example, two seconds according to experiment results. However, the above-described values become deviated depending upon a rigidity of trunk lid 1 of the vehicle and speed-reduction ratio of the driving device. Therefore, the scope of the present invention is not limited to the first and second preferred embodiments. It is also noted that a closed state detection switch 22 shown in FIG. 5 outputs a closed state detection signal to controller 14 to stop motor 8 when trunk lid 1 is reached to the immediate complete closure prior position C. It is also noted that the immediate complete closure prior position C is a position of trunk lid 1 on luggage compartment 1*a* immediately before trunk lid 1 is completely closed and lock device 4 is located on a center end portion of trunk lid 1 and striker 5 is located on a corresponding center end of luggage compartment 1*a*.

The entire contents of Japanese Patent Applications No. 2000-399960 and 2000-399961 (both being filed in Japan on Dec. 28, 2000) are herein incorporated by reference. The scope of the invention is defined with reference to the following claims.

What is claimed is:

1. A closure apparatus in combination with an elongated lid of a compartment, the lid being pivotally supported on a wall defining the compartment via a pair of mutually spaced apart hinge arms, comprising:

a driving device that drives the lid to be pivoted in at least a closure direction via one of the pair of mutually spaced apart hinge arms;

an electromagnetic clutch that disconnectably connects an operation force transmission path between the driving device and the lid;

a lock device that is enabled to be engaged with the lid at a first closure position of the lid to the compartment and to restrict the lid into a locked state;

a detecting section that detects an engagement state of the lock state of the lock device with the lid and outputs a locked state detection signal indicating the engagement state thereof with the lid; and a control device that controls each of the driving device and the electromagnetic clutch to make a deformation of the lid to the compartment return to its original form in response to an output of the locked state detection signal from the detecting section.

2. The closure apparatus of claim 1, wherein the control device comprises a first driving section that drives the driving device to rotate in an open direction by a predetermined quantity, stops a rotation of the driving device, and, thereafter, disconnects the electromagnetic clutch.

3. The closure apparatus of claim 2, further comprising a second driving section that drives the lid from the first closure position to a second closure position and wherein, in response to the output of the locked state detection signal, the control device operates the second driving section to drive the lid from the first closure position to the second closure position and, at the same time, drives the driving device to rotate in an open direction by a predetermined quantity, stops a rotation of the driving device, and, thereafter, disconnects the electromagnetic clutch.

4. The closure apparatus of claim 3, the driving device comprising a reversible motor and wherein the reversible motor of the first driving device is stopped when the reversible motor thereof is rotated in a normal direction which corresponds to the closure direction of the lid and the looked state detection signal is outputted, thereafter, is rotated in a reverse direction which corresponds to the open direction of the lid by the predetermined quantity and, thereafter, is stopped.

5. The closure apparatus of claim 1, wherein the driving device comprises a reversible motor and wherein the lock device is located on a center end position of the lid and a striker is located on a corresponding rear center portion of an opposing wall of the compartment to the wall of the compartment.

6. The closure apparatus of claim 1, wherein the control device decreases gradually an applied voltage to the electromagnetic clutch so that the electromagnetic clutch is caused to be in an intermediate state between a clutched state thereof and a released state thereof from a time at which the locked state detection signal is outputted and disconnects the electromagnetic clutch after a predetermined time has passed from the time at which the looked state detection signal is outputted.

7. The closure apparatus of claim 1, further comprising a second driving section that drives the lid from the first closure position to a second closure, and wherein in response to the output of the locked state detection signal, the control device operates the second driving section to drive the lid from the first closure position to the second closure position, and the control device comprises a control section that decreases gradually an applied voltage to the electromagnetic clutch so that the electromagnetic clutch is caused to be in an intermediate state between a clutched state thereof and a released state thereof from a time at which the locked state detection signal is outputted and disconnects the electromagnetic clutch after a predetermined time has passed from the time at which the locked state detection signal is outputted.

8. The closure apparatus of claim 7, wherein the control device comprises a timer to measure a time duration from the time at which the locked state detection signal is outputted and the control device determines whether the time duration measured by the timer indicates the predetermined time and further comprising a complete closure detection switch which is turned on when the second driving device drives the lid from the first closure position to the second closure position so that the lid is displaced from the first closure position to the second closure position and wherein the control device zeroes the applied voltage to the electromagnetic clutch when the timer indicates the elapse of the predetermined time or the complete closure detection switch is turned on.

9. The closure apparatus of claim 1, wherein the lid is a trunk lid and the compartment is a luggage compartment of an automotive vehicle.

10. A closure method in combination with an elongated lid of a compartment, the lid being pivotally supported on a wall defining the compartment via a pair of mutually spaced apart hinge arms, comprising:

driving the lid to be pivoted in at least a closure direction via one of the pair of mutually spaced apart hinge arms;

providing an electromagnetic clutch disconnectably connecting an operation force transmission path between the driving device and the lid;

providing a lock device that is engaged with the lid at a first closure position of the lid to the compartment and restricts the lid into a locked state;

detecting an engagement state of the lock state of the lock device with the lid, outputting a locked state detection signal indicating the engagement state thereof with the lid; and controlling each of the driving device and the electromagnetic clutch to make a deformation of the lid to the compartment when the lid is engaged with the lock device return to its original form in response to an output of the locked state detection signal.

* * * * *